United States Patent Office 3,393,048
Patented July 16, 1968

3,393,048
PROCESS FOR THE DISSOCIATION OF
AMMONIUM SALTS
André Steinmetz, Aubervilliers, Seine-St.-Denis, France, assignor to Produits Chimiques Pechiney St.-Gobain, Neuilly-sur-Seine, France
No Drawing. Filed May 28, 1963, Ser. No. 283,684
Claims priority, application France, June 8, 1962, 900,202
4 Claims. (Cl. 23—193)

This invention relates to the dissociation of ammonium salts, particularly ammonium chloride. As the invention is particularly related to the dissociation of ammonium chloride and the recovery of its constituents, it will be described in connection with that process.

Several physical or chemical processes are known which permit one to obtain ammonia and chlorine from ammonium chloride, but it is difficult to obtain good yields of those components by such processes. If one takes extreme precaution, one may obtain adequate yields of ammonia, using catalytic masses of metal oxides, but on the other hand the yields of chlorine gas are generally poor. The reason for this is that such processes produce a high proportion of HCl with the chlorine. To free the chlorine it becomes necessary to use a deacon-type process capable of dissociating HCl. Generally, the recovery of 70 to 75% of the chlorine as a gas is considered high.

It is an object of this invention to dissociate ammonium chloride into ammonia and chlorine with yields generally above 90% of each component. Another object of the invention is to prepare a new catalyst of superior utility. Another object is to activate and regenerate the catalyst. Yet other objects will be apparent as the description proceeds.

The objects of the invention are accomplished, generally speaking, by a catalyst for the preparation of ammonia and chlorine from ammonium chloride which consists in its essential elements of an alkali-metal salt of the class of halides, and a partly reduced metal oxide, and by a method of producing ammonia and chlorine from solid ammonium chloride which comprises heating the chloride with a catalyst containing an alkali-metal halide and a partly reduced metal oxide to about 360–420° C., recovering the ammonia as it is liberated, oxidizing the mass, heating the mass to about 480–520° C., and recovering the chlorine as it is liberated.

The process takes place in two stages producing ammonia gas in the first stage in yields generally around 98% and chlorine gas in the second stage in yields generally better than 90%. In carrying out the process, ammonium chloride is decomposed by means of a single catalytic mass which is readily activated and readily regenerated and has as its essential constituents a partly reduced metal oxide, in which the oxygen content is between the maximum and minimum for that oxide, associated with an alkali-metal salt of the halide class. If it is desired, one may extend this catalytic mass with an inert solid diluent such as silica, and one may increase its activity by adding a rare earth salt. Examples of the rare earth are cerium, lanthanum, praseodymium, and samarium which may be used in the form of their chlorides and oxides.

The catalyst is preferably used as a finely divided, partly-reduced metal oxide mixed with finely divided potassium chloride. The oxides of the iron-manganese family of metals are preferred and $Fe_2O_3$ and $Mn_2O_3$ are of exceptional value when partly reduced. The proportion of KCl to $Fe_2O_3$ or $Mn_2O_3$, expressed in moles, is between about .3 and about .4.

According to other characteristics of the invention the activation of the catalytic mass is obtained by raising it to a temperature circa 500 to 530° C., in a current of reducing gas such as carbon monoxide or illuminating gas. The exposure has for object to reduce metal oxide to a lower degree of oxidation and in any case will be stopped before complete reduction takes place. This activated mass is then intimately mixed with solid ammonium chloride. In general practice the catalyst is thus regenerated after each run, being thus returned to its original state.

In the first step of the process of dissociating the ammonia and the chlorine, the ammonium chloride is heated in contact with the catalyst to about 360 to about 420° C. The liberated ammonia can be swept out of the catalyst in a current of inert gas such as nitrogen or reducing gas such as carbon monoxide. During the reaction, the metal oxides are partly transformed to chlorides. As soon as the release of the ammonia ends, the second step of the process is undertaken. A moderate current of oxygen or oxygenated air, preferably dry, is passed through the mass, a rise in temperature follows as the chlorides are oxidized and as the partly reduced oxides are oxidized, then the temperature is raised to about 480 to 520° C. so as to decompose the metal chlorides. The chlorine which is released is recovered in its turn and by known means. When the operation of dechlorination ends, the catalytic mass may be regenerated by raising the temperature to 500 to 530° C. and passing a reducing gas through it. This requires only a few seconds or only a few minutes and the catalyst is regenerated and can generally be used several times before it must again be regenerated.

The process produces yields of ammonia on the order of 98% of that which is theoretically possible, and yields of chlorine gas on the order of 90 to 98% of that which is theoretically possible. Such yields are unknown to the prior art.

A particular advantage of the invention is that the temperatures at which the process is carried out are considerably lower than those of the processes generally used in the prior art.

The process can be carried out by putting a plurality of reactivators in series or parallel so that some may be in the process of regeneration while others are in use.

The following examples illustrate the invention but do not impose any limitations on the generality of what has been elsewhere stated.

Example I

A catalytic mass is prepared by mixing 80 grms. of $Fe_2O_3$ and 14 grms. of KCl with vigorous agitation. This mixture was activated by passing 10 liters of carbon monoxide through it at a temperature of 500 to 520° C. which required only a few minutes. This mass was cooled out of contact with the air and there were added to it, with vigorous agitation 12 grms. of ammonium chloride. The mixture was placed in a reactor and heated to 400 to 420° C. while passing a gentle current of carbon dioxide through it to capture the ammonia.

The apparatus was scavenged of gas by a current of nitrogen. Oxygen was then admitted, the temperature went up as the chlorides and reduced oxides were oxidized and the mass was heated to 500 to 520° C. to liberate the chlorine. The chlorine was recovered. The yield was 98.6% of ammonia and 90% of gaseous chlorine.

Example II

The catalyst was prepared from 80 grms. of $Fe_2O_3$ and 14 grms. KCl. It was treated with 10 liters of illuminating gas at a temperature of 500° C. 12 grms. of ammonium chloride were mixed with the mass and the operation proceeded as in Example I. The yield of ammonia was 99% and the yield of chlorine was 93.8%.

Example III

A catalytic mass having the same composition as in Example I was prepared and activated in carbon monoxide between 500 and 520° C. It received an admixture of 12 grms. of ammonium chloride. The ammonia and the chlorine were liberated as in Example I. The catalyst was reused a number of times by regeneration after each operation and by the mixing of the regenerated catalyst with 12 grms. of ammonium chloride. The following results were obtained:

|  | Ammonia yield in percent | Chlorine yield in percent |
|---|---|---|
| On the original catalyst | 98.6 | 90.8 |
| After the first regen | 98.8 | 92.6 |
| After the second regen | 98.5 | 93 |
| After the third regen | 98.5 | 92.2 |
| After the fourth regen | 98.7 | 92.2 |
| After the fifth regen | 98.6 | 92.8 |

The advantages of the invention are in the accomplishments of the objects of the invention and particularly in the use of lower temperatures of reaction, in obtaining better yields of chlorine and ammonia, and in the simplicity and facility of the process.

As many apparently widely different embodiments of the present invention may be made without departing from the spirit and scope thereof, it is to be understood that the invention is not limited to the specific embodiments.

What is claimed is:

1. A method of preparing ammonia and chlorine from ammonium chloride by means of a catalyst having as essential ingredients a member of the group consisting of $Fe_2O_3$ and $Mn_2O_3$, and an alkali metal chloride, which comprises partially reducing the metallic oxide in a reducing gas at a temperature of about 500–530° C., putting ammonium chloride into contact therewith at a temperature of about 360–420° C. and recovering the liberated ammonia, oxidizing the catalytic mass at about 480–520° C. by means of a gaseous oxidizing agent, and recovering the liberated chlorine.

2. A method according to claim 1 in which the alkali metal chloride is KCl.

3. A method according to claim 1 in which the molar ratio $KCl/Fe_2O_3$ is in the range about .3 to .4.

4. A catalyst for the preparation of ammonia and chlorine from ammonium chloride which consists in its essential elements of an alkali-metal chloride and a partly reduced metal oxide of the class consisting of $Mn_2O_3$ and $Fe_2O_3$, the molar ratio $KCl/Fe_2O_3$ or $KCl/Mn_2O_3$ being in the range from substantially .3 to substantially .4.

References Cited

UNITED STATES PATENTS

| 2,577,808 | 12/1951 | Pye et al. | 23—219 |
| 2,823,981 | 2/1958 | Fuchsman | 23—193 |
| 3,210,158 | 10/1965 | Engel et al. | 252—441 X |
| 925,253 | 6/1909 | Whitehouse | 23—219 |
| 2,542,464 | 2/1951 | Black et al. | 252—441 |
| 2,729,664 | 1/1956 | Kirshenbaum | 252—441 |

FOREIGN PATENTS

| 8,308 | 6/1886 | Great Britain. |
| 17,273 | 12/1887 | Great Britain. |
| 15,140 | 7/1907 | Great Britain. |

OSCAR R. VERTIZ, *Primary Examiner.*

J. J. BROWN, H. S. MILLER, *Assistant Examiners.*